United States Patent [19]
Ruozi

[11] Patent Number: 5,074,200
[45] Date of Patent: Dec. 24, 1991

[54] SYSTEM FOR PASTEURIZING OR STERILIZING FOODSTUFFS UTILIZING MICROWAVES

[75] Inventor: Giuseppe Ruozi, Reggio Emilia, Italy

[73] Assignee: Officine Meccaniche Attrezzature Per Ceramiche, Pratissolo de Scandiano, Italy

[21] Appl. No.: 360,798

[22] Filed: Jun. 2, 1989

[30] Foreign Application Priority Data

Jun. 7, 1988 [IT] Italy ............................ 40090 A/88

[51] Int. Cl.⁵ .................... A23L 3/04; A23L 3/32; H05B 6/78
[52] U.S. Cl. .................................. 99/451; 99/477; 99/483; 99/DIG. 14; 219/10.55 A; 422/304
[58] Field of Search .............. 99/358, 443 R, 443 C, 99/451, 467, 470, 477–479, 483, DIG. 14, 361, 362; 219/10.55 A, 10.55 E, 10.55 R, 10.55 F; 426/234, 235, 241; 422/302, 304, 299

[56] References Cited

U.S. PATENT DOCUMENTS

| | | |
|---|---|---|
| 3,570,391 | 3/1971 | Rejier .................................... 99/470 |
| 3,718,082 | 2/1973 | Lipoma .................................. 99/362 |
| 3,961,569 | 6/1976 | Kenyon et al. ........................ 99/451 |
| 4,059,046 | 11/1977 | Yamazaki et al. .................... 99/355 |
| 4,164,590 | 8/1979 | Mencacci ............................... 99/470 |
| 4,385,035 | 5/1983 | Akitoshi et al. ...................... 99/483 |
| 4,525,978 | 7/1985 | Hayase et al. ...................... 422/302 |
| 4,661,325 | 4/1987 | Noro et al. ............................ 99/470 |
| 4,773,321 | 9/1988 | Wijts ..................................... 422/304 |
| 4,803,055 | 2/1989 | Ueda .................................... 422/304 |
| 4,974,503 | 12/1990 | Koch ............................ 219/10.55 A |

FOREIGN PATENT DOCUMENTS 3604808 8/1987 Fed. Rep. of Germany ........ 99/470

Primary Examiner—Timothy F. Simone
Attorney, Agent, or Firm—Lowe, Price, LeBlanc & Becker

[57] ABSTRACT

Foodstuff packaged in a material transparent to microwaves is conveyed continuously through an environment pressurized to 2.5 bar max so as to prevent the containers or wrappers bursting or being forced out of shape; in four steps, the temperature is raised quickly to a prescribed treatment value with high frequency microwave radiation, stabilized by applying a combination of lower power microwaves and hot air, held steady with hot air only, and then lowered by cooling. In a split-level cylindrical oven, the upper level consists in a pressure-and-temperature compensating chamber (4), a high speed heat chamber (5) with closely spaced microwave generators (24) ordered in longitudinal rows along its top and sides, the waveguides (24', 25) of which are directed at the containers or wrappers (C) of foodstuff from above and beneath as they are indexed through on special pallets (S), and a stabilization chamber (5') in which lower power microwaves combine with air drawn through heaters (20) and circulated by a fan (21) located at the closed end of the oven; the same air is used to heat a vertical chamber (6), through which the pallets descend on an elevator (D) before passing into a cooling chamber (7) on the lower level and proceeding toward the final outgoing compensating chamber (8). Once out of the oven, the pallets (S) are raised by a further elevator (A) to the upper level for emptying and reloading.

12 Claims, 6 Drawing Sheets

SYSTEM FOR PASTEURIZING OR STERILIZING FOODSTUFFS UTILIZING MICROWAVES

BACKGROUND OF THE INVENTION

The invention disclosed relates to a method of pasteurizing and sterilizing foodstuffs utilizing microwaves, and to an oven for implementing such a process, that is, a new microwave process by which to reduce or eliminate bacteria from foods for human and animal consumption, and thus prolong the period for which they can be preserved; both the method and the oven used for its implementation constitute the subject matter of the application.

In addition to the long-standing hot air, hot water and vapor methods of pasteurization (85° C.) and sterilization (121° C.), and to methods of deep freezing ($-25°$ C.), the prior art also embraces a type of treatment utilizing microwaves generated at the conventional frequency of 2.450 MHz.

Traditional hot air, hot water and vapor methods are beset by several drawbacks, namely long exposure times, lack of continuity, a cooked effect produced by the high temperatures adopted to speed up the process, non-uniform temperatures, deterioration of or damage to wrappings, and unsatisfactory results in the case of solid foods, due to the slow transfer of heat by conduction.

There are also drawbacks with the deep-freezing of foodstuffs, most notably the greater complexity and cost of equipment as compared with that utilized for pasteurization and sterilization.

Microwave treatment of foodstuffs involves the application of heat by inducing molecular vibration throughout the entire mass of the edible substance, and thus brings a number of theoretical advantages: pasteurization or sterilization can be achieved in a much shorter time than is possible by applying heat directly; the organoleptic properties of the food are improved, as also is its appearance and that of its wrapping; labor costs are cut by virtue of the automation obtainable; the cooked effect is reduced; sterilization of solids can be achieved without the need to use regulating fluids, and pasteurization is made possible without excessive damage occurring to wrappings as a result of internal pressure generated by evaporation and heat. The only disadvantage is that the wrappings utilized must be transparent, wholly or in part, to microwave radiation.

Notwithstanding these apparent advantages, the attempts made thus far at microwave pasteurization and sterilization on an industrial scale have not been such as to develop a continuous pasteurization method whereby packaged foodstuffs can be subjected to uniform and stable heat throughout the entire area of the oven; neither has sterilization been successful, inasmuch as the requisite temperature level tends to prduce internal gas pressures of an order that often causes the wrapping or container to explode.

Accordingly, microwave methods do not constitute a viable proposition at industrial level.

The prior art as summarized above thus stands in need of considerable improvement, the objects being to eliminate the aforementioned drawbacks besetting microwave pasteurization, and to enable the use of microwave radiation in effecting sterilization on industrial scale.

It will be discerned from the foregoing that the requirement exists for a new method of microwave treatment capable of being operated continuously, of ensuring that each container or wrapper containing the foodstuff will be invested with a constant, uniform heat, according to the temperature selected, without bursting or becoming distorted (even at high sterilization temperatures), and of turning out an end-product substantially fresher than is obtainable conventionally, in less time and with less waste.

SUMMARY OF THE INVENTION

The stated objects are achieved by adoption of a microwave pasteurization or sterilization method using high frequency microwaves, say of 2.450 MHz; the liquid or solid foodstuff for treatment, batched into containers or wrappers completely transparent to microwaves, is fed into and conveyed forward through and environment pressurized in such a way as to set up a balancing pressure, maximum 2.5 bar for example, that will prevent the container or wrapper from bursting or distorting as a result of the heat generated by high frequency radiation.

The product is exposed to microwaves from above and below for an initial high speed heat step, say, of 4-10 minutes duration, in which the temperature rises to a prescribed level; this is followed by a second step that serves to stabilize the initial temperature rise, and involves further application of microwaves from above and below, in this instance less intense and accompanied by hot air, for example between 90° and 125° C. and circulated for a period of approximately 2-4 minutes, to the end of obtaining an identical temperature internally of each wrapper or container. A third step involves maintaining the temperature uniform for between 1 and 10 minutes by continued circulation of hot air. In the fourth and final cooling step, the product is invested with cold air in such a way as to bring the temperature down to approximately half the level of the former steps, or at all events to a level that will ensure there is no danger of the containers or wrappers bursting or distorting.

Pressure levels are compensated during passage of the product from atmospheric to internal pressurized conditions, and viceversa, as also are temperature levels, particularly at the entry stage.

The oven used to implement the method disclosed consists in a longitudinal cylindrical tunnel type structure divided horizontally into two distinct levels: an upper level, through which the containers or wrappers filled with the foodstuff travel during the initial steps, arranged in rank-and-file on pallets and propelled step by step along tracks by horizontal rods, and a lower level of smaller volume along which the return passage is effected in the same fashion.

Single pallets bearing the product are propelled along the upper level by pairs of reciprocating rods: a first pair of rods passing through a hinged airtight flap, which push the pallet into an initial pressure compensating chamber prior to its entering the oven; a second pair of rods effecting passage from the chamber through a further hinged airtight flap into the oven proper; and a third pair of rods by which the column of pallets is propelled through to the end of the heat generation and temperature stabilization steps of the process.

Maintained substantially at the temperature and pressure levels existing in the oven proper, and capable of accomodating the contents of one pallet, the compensating chamber is equipped with valves that admit and discharge pressurized air, and a pair of tracks across which the single pallets pass in a longitudinal direction from the tracks at the entry side onto those at the exit side. The compensating chamber leads into a resonant heat chamber served by medium-low power microwave generators (e.g. adjustable between 0 and 1200 W in the initial high speed heat section) arranged in closely spaced rows along the top and side of the cylinder; in a preferred embodiment, the three rows uppermost will be spaced apart approximately 40 cm apart lengthwise, one at center and the other two at 45° on either side, with two additional rows set at 30° farther around the circumference of the cylindrical structure (which will be some 2 meters in diameter).

The generators of the top three rows have hollow wave-guides of rectangular section that project down radially toward the product, whilst the waveguides of the side rows project radially at first and are then diverted horizontally, converging ultimately at center. Beyond the high speed heat chamber in the stabilization chamber, use is made of lower power microwave generators (max 1000 W as against 1200 W), set farther apart and in alternation, combined with hot air drawn in from the top part of the tunnel, above the level of the conveyed product, by a fan unit located at the end of the cylindrical structure (which will be some 12 meters in length); the air is directed over a baffle through a battery of electric heaters positioned in the top of the tunnel, taken in by the fan and blown at the oncoming pallets, passing through a descending elevator that occupies a vertical chamber located between the stabilization chamber and the fan end of the oven. The elevator receives one pallet-load of the product with each indexed step of the propulsion system, tranferred into position by reciprocating rods with pivoted catches, and at the same moment releases the pallet occupying its bottom tier, which is transferred through a hinged airtight flap onto the tracks of the lower return level of the oven.

Passage through the flap is produced by further reciprocating longitudinal propulsion rods with pivoted catches that move longitudinally across the bottom of the vertical chamber above a longitudinal baffle which, together with the flap, separates the vertical hot air chamber from the cooling chamber; the rods engage each of the descending pallets in turn and propel them nose to tail back through the cooling chamber toward the exit of the oven.

Blown horizontally through the descent elevator, hot air is gathered between the separating baffle at bottom and a further baffle above, and directed back into the stabilization zone, passing beneath the oncoming pallets then rising around and between them to return toward the heaters. The bottom part of the oven serves to effect the cooling process. Pallets carrying the containers or wrappers, transferred from the bottom tier of the descent elevator and propelled along the track, are invested with cold air from transversely positioned fan units located at bottom; the temperature of the product is brought down to 50°-60° C. or thereabouts by the cold air stream, the cold draft being favored by transverse ridges formed in the pallet surface.

On reaching the end of the return stretch, the leading pallet is engaged by a pair of reciprocating rods with pivoted catches and transferred into the outgoing compensating chamber, which is situated beneath the incoming chamber and provided similarly with inlet and outlet air valves, tracks, and hinged airtight flaps; the pressure level in this chamber is identical to that existing in the oven, and the temperature identical to that of the cooling stage.

The single pallets are transferred by further push rods out of the compensating chamber and onto a pair of longitudinal horizontal belt loops which index them toward the bottom tier of an ascending elevator (lying in the same plane as the bottom tier of the descending elevator), then raised ultimately to a position that coincides with the upper level on which entry into the oven occurs, but is set back from the actual entry point.

The pallet is now indexed forward by a pair of push rods onto a pair of tracks forming part of the upper level, moving through a distance corresponding to the depth of the ranks of containers or wrappers in which the foodstuff is batched, whereupon the single containers or wrappers themselves are picked up by suckers mounted to a swing arm, and set down in single file on a transverse runout line.

As the rods continue indexing forward, the empty pallet is filled again, rank by rank, from an infeed line disposed parallel to the runout and served by an identical swing arm with suckers; refilled, the pallet is propelled forward by the same rods into the upper compensating chamber. Advantages of the invention are: uniform heat treatment through the different areas of the oven, and from container to container; stabilization to a prescribed temperature effected in short intervals of time and space; instant adaptability to different production cycles given by extensive adjustment in power output of the individual microwave generators; constantly repeated pasteurization, and no rejects; ease and speed of sterilization on industrial scale, with no deterioration either of the packaging or of the end-product; low running costs.

BRIEF DESCRIPTION OF THE DRAWINGS

The invention will now be described in detail, by way of example, with the aid of the accompanying drawings, in which.

DESCRIPTION OF THE PREFERRED EMBODIMENTS

Figure 1:
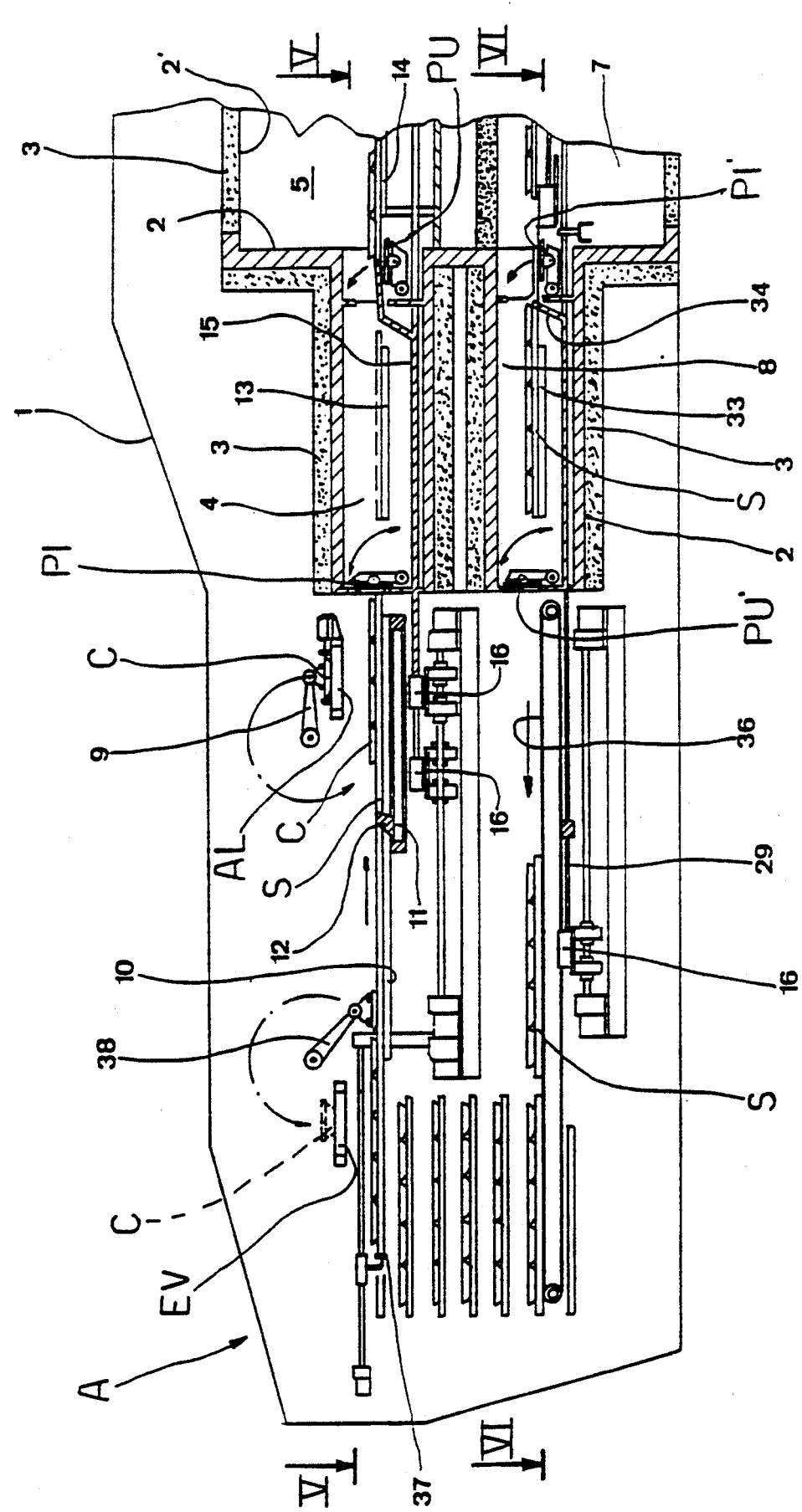
FIGS. 1, 2 & 3 are longitudinal vertical sections of the oven illustrating the zones in which the various steps of the method are implemented, respectively: infeed/runout and pressure/temperature-compensation (FIG. 1); high speed heat, temperature stabilization and cooling (FIG. 2); again, heat and stabilization, and subsequent holding of the stable temperature (FIG. 3)
Figure 2:
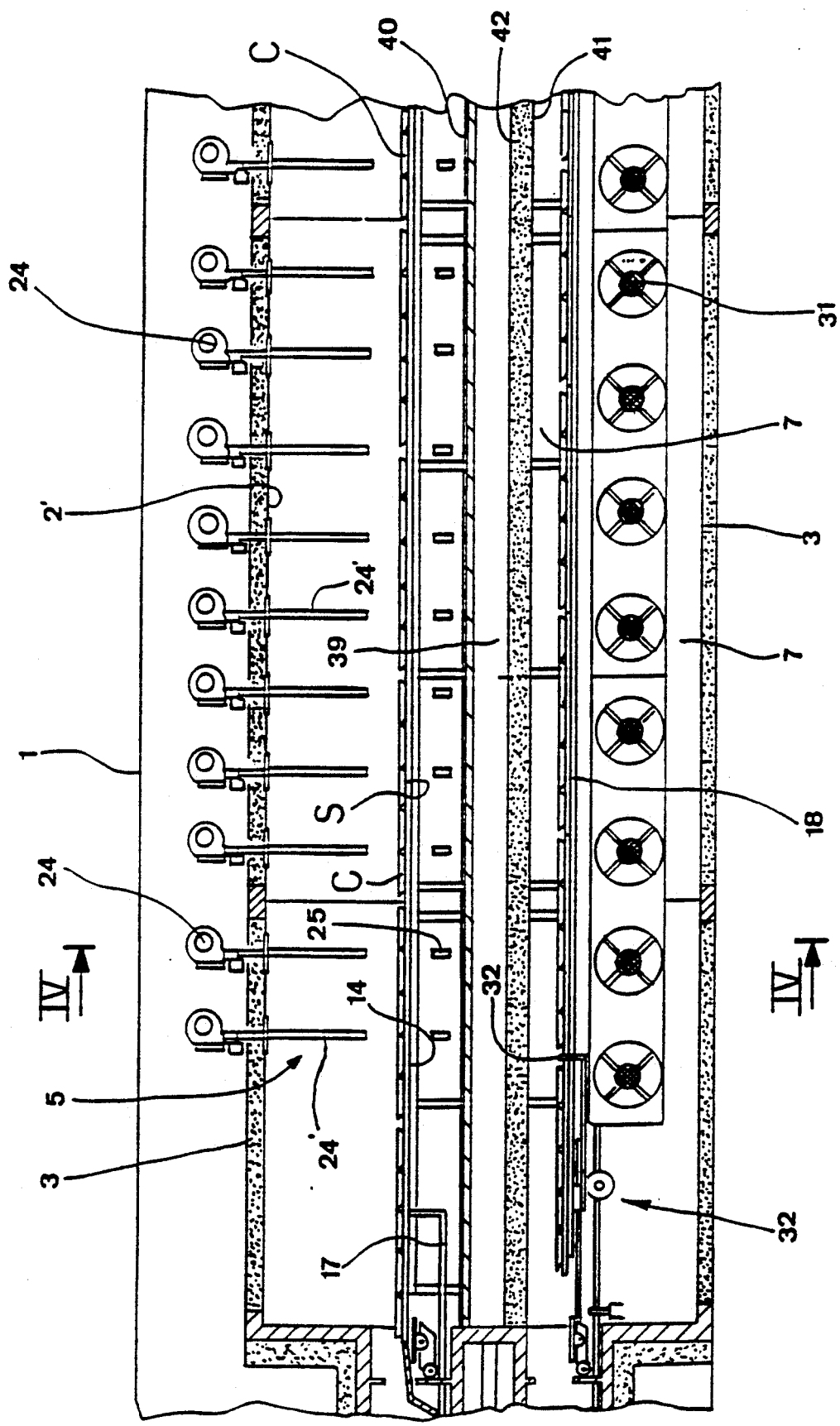
Figure 3:
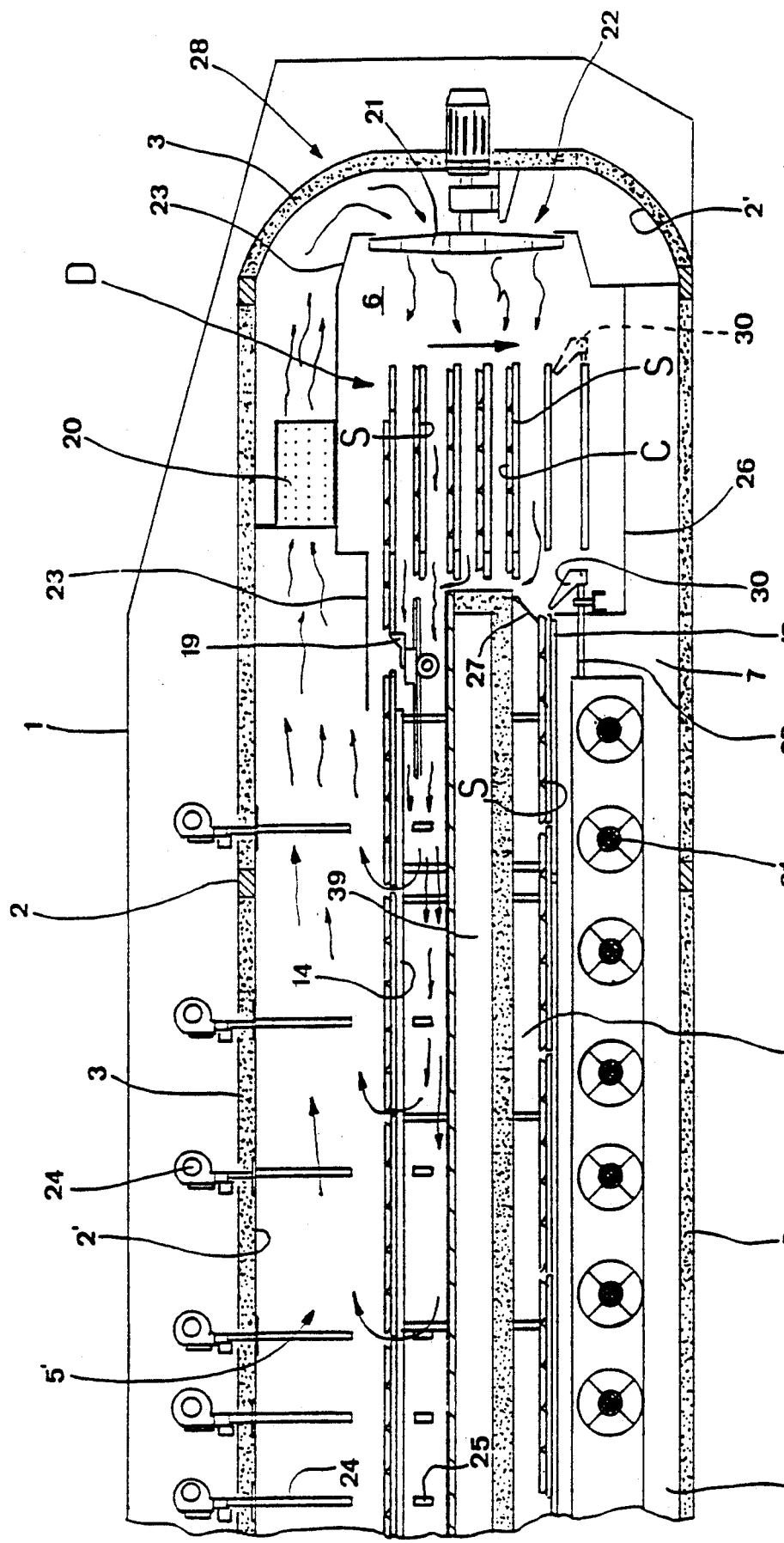

In the drawings, 1 denotes the protective outer casing of the entire oven installation, for example, embodied in stainless steel; this encompasses a cylindrical metallic skeleton structure 2, and attached thereto, an internal sheet metal lining 2' shaped to form a cylindrical enclosure and lagged externally with heat insulating material 3. 4 denotes the incoming pressure-and-temperature compensating chamber, the capacity of which is equal to the contents of one pallet-load of the edible product.

5 denotes the initial high speed heat chamber, and 5' the chamber in which the temperature reached in the first chamber is stabilized, and internally of which pasteurization or sterilization of the end-product effectively takes place. 6 denotes the chamber in which stable pasteurizing or sterilizing temperature is held steady for a given prescribed duration. 7 denotes the chamber in which the product is cooled, and 8 the outgoing compensating chamber, likewise able to accommodate one pallet.

Single containers C of the edible product to be pasteurized or sterilized are conveyed toward the oven along an infeed line AL and transferred into special pallets S, each one of which exhibits a bearing surface fashioned in polycarbonate material transparent to microwaves, a teflon frame (likewise transparent), and a right longitudinal section of ribbed profile; the transfer is effected by a swing arm 9 with suckers.

The pallet S is made to slide along a pair of longitudinal tracks 10, also in teflon, by means which comprise a pair of longitudinally disposed pneumatic cylinders 11 located one at either side of the tracks and associated in turn with a pivoted catch 12 in such a way as to create a pair of actuators that index the pallet S through a longitudinal path into the compensating chamber 4.

PI denotes a hinged flap affording entry to the compensating chamber 4 and incorporating sections of track that align with a further pair of longitudinal teflon tracks 13 inside the chamber 4 itself, thus providing a continuation of the external tracks 10.

PU denotes a hinged flap at the exit end of the compensated chamber 4, embodied in similar fashion to the entry flap PI and aligned with a pair of longitudinal teflon tracks 14 running the entire length of the two chambers denoted 5 and 5'.

15 denotes a second pair of longitudinal push rods, operated by belt-driven propulsion units 16 in this instance, that serve to transfer the pallets S from the compensating chamber 4 to the heat chamber 5 and stabilization chamber 5'; once inside the heat chamber 5, the pallets S are propelled through the oven nose-to-tail by a third pair of longitudinal push rods 17, also belt-driven, that impinge on the trailing edge of the hindmost pallet.

D denotes an intermittently operated descent elevator occupying the vertical chamber 6, which consists in tiered pairs of bearers associated with respective mutually opposed chain loops and receives the pallets S from the longitudinal tracks 14 of the upper level and transfers them to a further pair of longitudinal tracks 18, also teflon, running through the cooling chamber 7 on the lower level.

19 denotes a pair of actuators consisting in pivoted catches operated by a piston and a pair of rack mechanisms, that serve to separate the leading pallet S of the column and position it on the vacant pair of bearers offered by the elevator D.

20 denotes a set of electrical resistance heater elements occupying a position at the top of the oven in a restricted terminal part of the stabilization chamber 5'; air drawn by a fan unit 21 through these heater elements is channeled through the center rear opening 22 of a longitudinal baffle 23 that extends rearward through the restricted zone and down toward the fan unit 21. Blown by the fan into the vertical chamber 6, the air is made to circulate beneath the pallets S occupying the temperature stabilization chamber 5'. The option exists of utilizing a heat exchanger in place of the electrical resistances.

Figure 4:
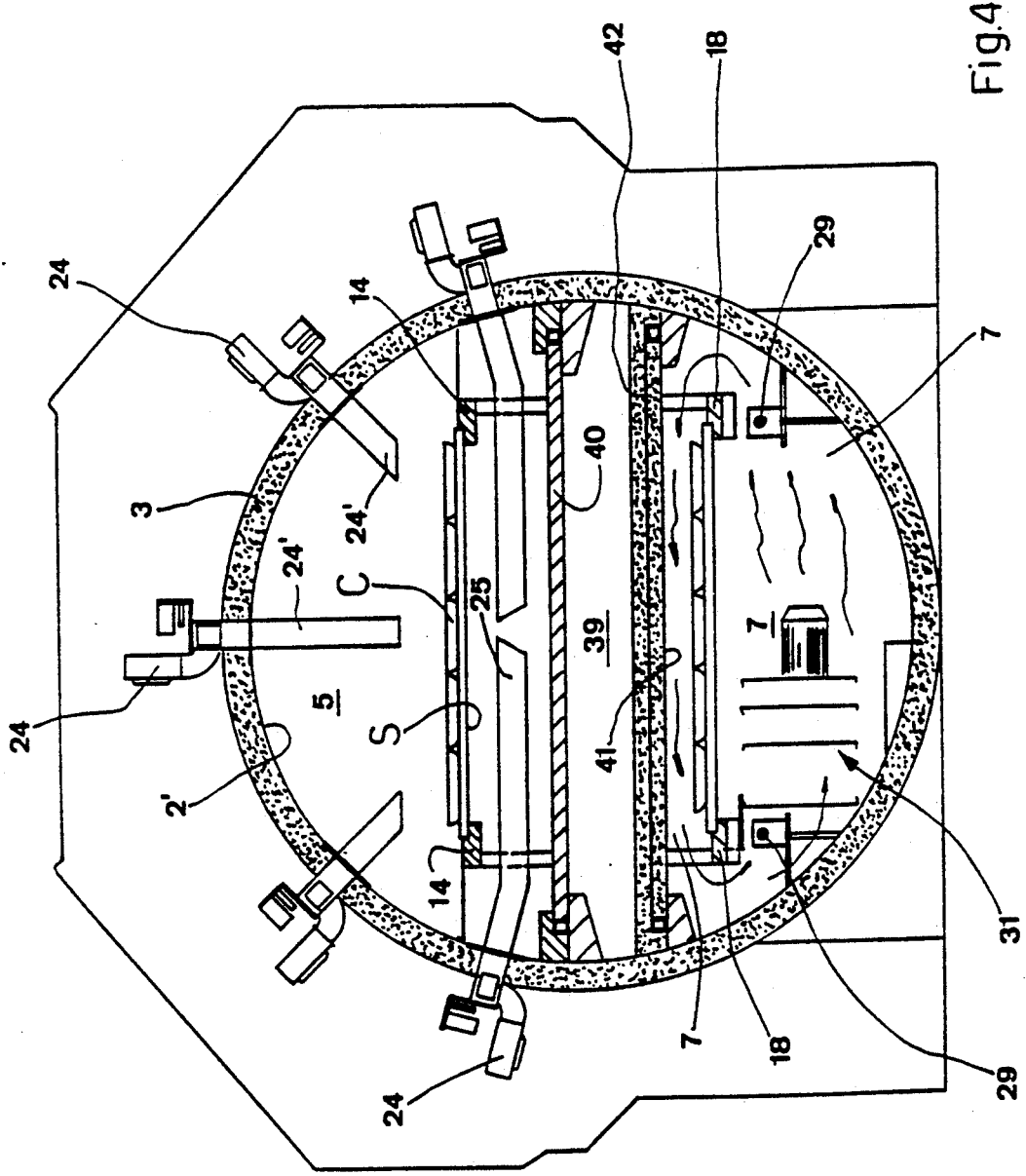
FIG. 4 is the vertical cross section through IV—IV in FIG. 2, illustrating the high speed heat zone.
Figure 5:
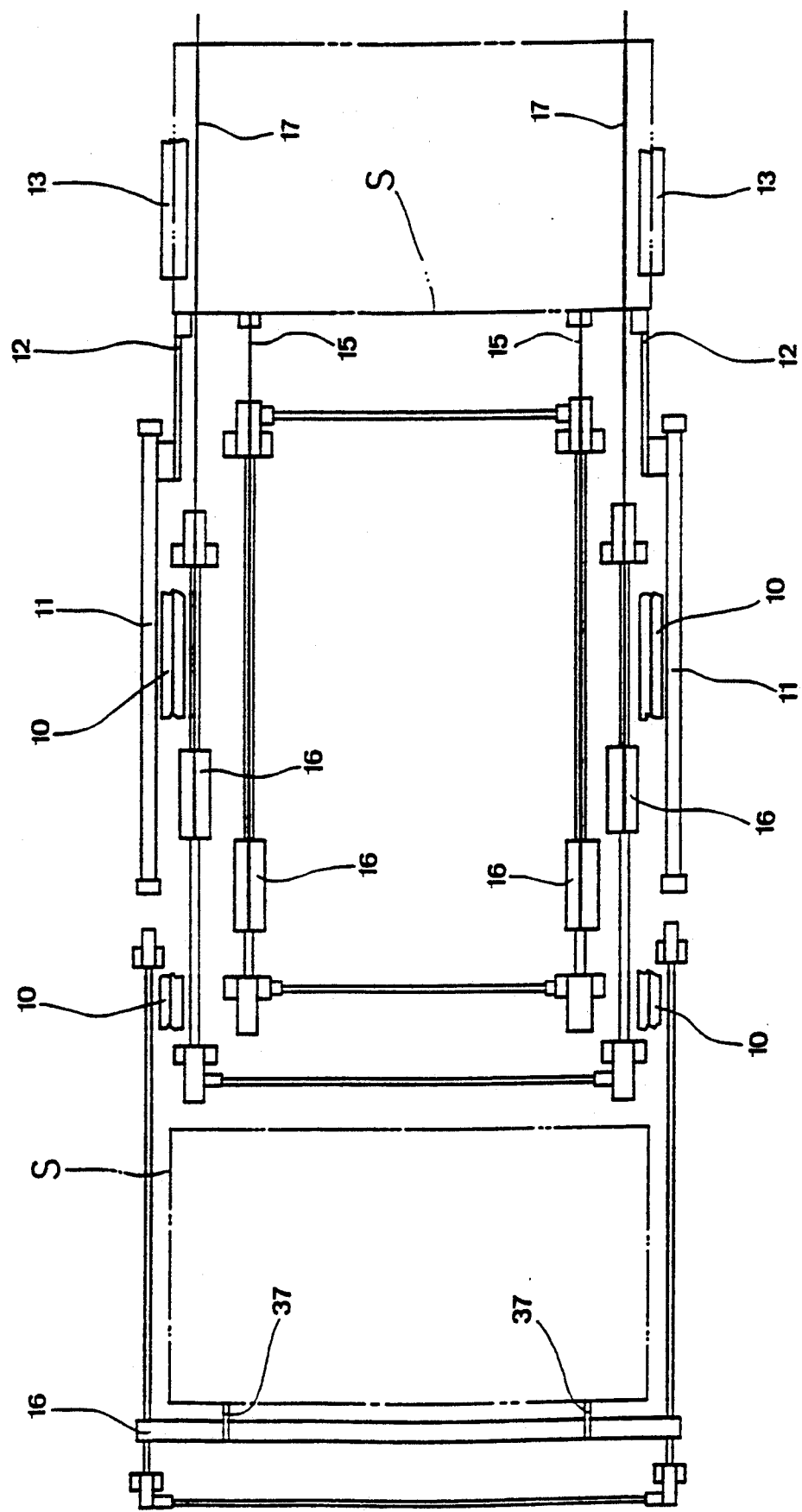
FIG. 5 is a horizontal longitudinal section through V—V in FIG. 1, illustrating the system of push rods operating on the upper level of the oven, externally at the runout and infeed station, and internally of pressur- and temperature compensating chamber.

24 denotes one of a plurality of magnetron type microwave generators arranged in longitudinal rows along the top half of the cylindrical enclosure and passing through the sheet lining 2' and insulation 3 to the interior; the generators 24 are radially disposed and distributed along the entire length of the heat and stabilization chambers 5 and 5', the three rows uppermost (see FIG. 4) being associated with waveguides 24' that project inward radially toward the containers C proceeding along the upper level. The waveguides 25 are equipped with radial perforations and project inward radially for a brief distance before extending into horizontal stretches that continue inward beneath the pallets S carrying the containers C and converge at center.

26 denotes a longitudinal baffle at the bottom of the oven, separating the vertical chamber 6 from the cooling chamber 7; this baffle 26 is effectively a continuation of the downwardly directed part of the top baffle 23, and is broken by a further hinged flap 27 through which the pallets S pass into the cooling chamber. 28 denotes the cap enclosing the end of the cylindrical structure 2. 29 denotes a pair of longitudinal rods occupying the cooling chamber 7, interconnected at their two ends and operated by a further pair of belt-driven propulsion units 16, the rear ends of which carry a pair of pivoted catches 30 designed to engage the pallet S occupying the bottom tier of the descent elevator D and transfer it through the hinged flap 27 and onto the tracks 18 of the lower level. 31 denotes a plurality of transversely disposed cooling fan units forming part of a bank of fin-fan heat exchangers.

32 denotes a pair of pivoted catches associated with a pair of reciprocating rods, that serve to transfer the pallets S from the cooling chamber 7 into the outgoing compensating chamber 8. PI' and PU' denote the respective hinged entry and exit flaps affording passage to the pallets S into and from this chamber 8, which are identical in all respects to those PI and PU of the chamber 4 above; likewise, 33 denotes a pair of longitudinal teflon tracks in the outgoing chamber 8 that are identical to the tracks of the incoming chamber 4.

Figure 6:
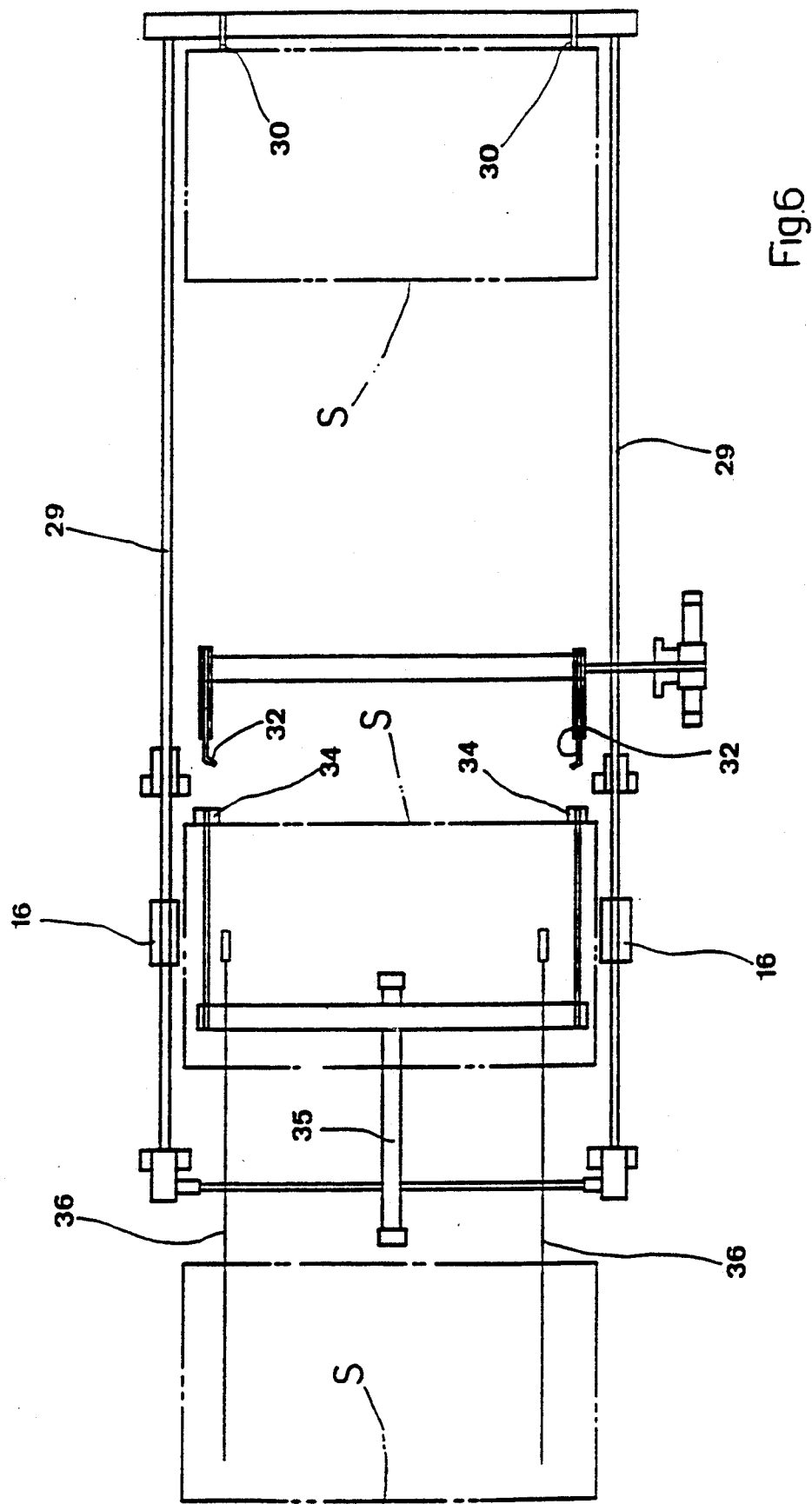
FIG. 6 is a longitudinal horizontal section through VI—VI in FIG. 1, illustrating the passage through the outgoing pressure- and temperature compensating chamber and the lower level of the runout station.

34 denotes a pair of catches operated by a power cylinder 35 (FIG. 6), serving to transfer the single pallets S from the outgoing compensating chamber 8 onto a pair of longitudinal belt loops 36.

A denotes an ascending elevator, identical in basic embodiment to the descent elevator D, which receives the pallets S with their load of cooled containers C from the belts 36 and transfers them back to the upper level, where they are returned to the pair of tracks 10 first mentioned by a pair of push rods 37 identical to the pair denoted 15.

38 denotes a swing arm with suckers identical to the arm 9 first mentioned, by which the containers C filled with the now pasteurized or sterilized edible product are transferred rank by rank onto a runout conveyor EV.

39 denotes a longitudinal and substantially diametral horizontal cavity by which the upper and lower chambers 5 and 7 are separated thermally to avoid the formation of hot spots. 40 and 41 denote two longitudinal horizontal shelves, the first fashioned in stainless steel and constituting the bottom wall of the upper multiresonant half of the cylindrical enclosure, the second situated beneath the first 40, providing the top wall of the cooling chamber 7; 42 are slabs of insulating material identical to that denoted 3.

Operation of the oven will now be described.

Containers or wrappers C of the edible product to be pasteurized or sterilized approach in single file on the infeed conveyor AL and are transferred rank by rank onto a pallet S prior to entering the pressure-and-temperature compensating chamber 4, which will be charged with air at the same pressure as that inside the oven proper (max 2.5 bar for example), to the end of balancing the internal pressure generated in the containers or wrappers (fashioned, say, from a film material transparent to microwaves) by exposure to microwave radiation as they pass along the chambers 5 and 5' in which pasteurization or sterilization occurs; temperatures of the order of 100° C. and more are generated in the initial heat chamber 5, e.g. 120°-140° C. in the case of sterilization, and then stabilized and held steady through the following chamber 5' with the aid of hot air.

Once the pallet of containers C has covered a given distance, say 10 meters, taking between 4 and 10 minutes, enveloped through the final stretch by hot air circulating at between 90° and 125° C., the prescribed stable treatment temperature will have been reached; the pallet S is now transferred onto the descent elevator D, and after a further period of between 1 and 10 minutes moving down through the vertical chamber 6, still enveloped by hot air, passes into the low level cooling chamber 7.

The cooling chamber is charged with cold air at a pressure identical to that of the top chambers, which brings the temperature down to some 50°-60° C.; at this juncture, any danger of the container or wrapper bursting or being forced out of shape can be discarded, and the pasteurized or sterilized end product can be returned to atmospheric conditions.

The pallet S is taken out through the appropriately conditioned outgoing compensating chamber 8 and back to the top level, where the containers are set down in single file on the runout line EV.

Uniformity of the heat treatment is ensured according to the invention by the positioning of the waveguides, encircling the product as it proceeds through the top chambers 5—5', and by the facility of regulating power output of the single microwave generators; indeed, the generators will be computer controlled in a preferred embodiment, so as to permit of monitoring their output individually and effecting the appropriate adjustments.

Similarly, the temperature of the hot and cold air supplies will be computer controlled.

The embodiment described and illustrated is by no means limitative. For example, the bottom sets of waveguides 25 need not necessarily converge at the center of the oven, but might be staggered on either side of center.

Similarly, the maximum pressure of 2.5 bar is intended as a safe value to balance the pressure generated internally of the container or wrapper, at all events, in the case of general solid foods for human consumption; nonetheless this value might be varied to suit the properties of different products for pasteurization or sterilization, to the same end of ensuring that the containers or wrappers do not burst, collapse or otherwise deteriorate.

What is claimed:

1. A system for pasteurizing or sterilizing packaged food, including an oven using microwaves at 2.450 MHz and pressure up to 2.5 bar, and arranged to prevent bursting or distortion of the packaging on the food, said oven comprising:
   means for heating the packaged food to a predetermined temperature initially at a high speed;
   means for stabilizing and holding the predetermined temperature reached by initial heating to sterilize or pasteurize the packaged food;
   means for cooling the packaged food following sterilization or pasteurization;
   said oven arranged as a horizontally disposed cylindrical structure split horizontally by a horizontal shelf into distinct upper level and lower level chambers, both pressurized, the upper level chamber of greater volume than the lower level chamber; and
   conveyer means for continuously moving packaged food along said upper level chamber and said lower level chamber of said horizontally disposed cylindrical structure;
   said system for pasteurizing and sterilizing further including
   pallet means, each having a ridged longitudinal profile to facilitate cooling and arranged to carry packaged food while being propelled on said conveyor means;
   a longitudinal incoming pressure-and-temperature compensating chamber, external to said oven and furnished with tracks along which pallet means containing packaged food are propelled, and
   a longitudinal outgoing pressure-and-temperature compensating chamber, external to said oven and furnished with longitudinal tracks along which pallet means containing packaged food are propelled.

2. A system for pasteurizing or sterilizing packaged food, including an oven using microwaves at 2.450 MHz and pressure up to 2.5 bar, and arranged to prevent bursting or distortion of the packaging on the food, said oven comprising:
   means for imparting microwave heating to the packaged food to heat the food to a predetermined temperature initially at a high speed;
   means for stabilizing and holding the predetermined temperature reached by initial heating to sterilize or pasteurize the food; and
   means for cooling the packaged food following sterilization or pasteurization;
   said system for pasteurizing or sterilizing further including a station for loading packaged food into said oven, arranged external to said oven, said station for loading food comprising
   an infeed line to carry containers of packaged food in single file; and
   means for propelling packaged food, including a first reciprocating push rod fitted with a pivoted catch mechanism.

3. A system for pasteurizing or sterilizing packaged food including an oven, using microwaves at 2.450 MHz and pressure up to 2.5 bar, and arranged to prevent bursting or distortion of the packages on the food, said oven comprising:
   means for heating the packaged food to a predetermined temperature initially at a high speed;
   means for stabilizing and holding the predetermined temperature reached by initial heating to sterilize or pasteurize the packaged food;

means for cooling the packaged food following sterilization or pasteurization;

said system for pasteurizing or sterilizing further including pallet means for carrying said packaged food;

a longitudinal incoming pressure-and-temperature compensating chamber for receiving food, arranged external to the oven;

a longitudinal outgoing pressure-and-temperature compensating chamber for dispensing sterilized or pasteurized packaged food, arranged external to the oven and beneath said longitudinal incoming pressure-and-temperature compensating chamber;

a station for handling packaged food, arranged external to the oven, wherein said packaged food is transported on pallet means, said station for handling packaged food comprising longitudinal belt loop arranged at said longitudinal outgoing pressure-and-temperature compensating chamber to transport sterilized or pasteurized packaged food on said pallet means away from said longitudinal outgoing pressure-and-temperature compensating chamber, a pair of longitudinal tracks arranged at said longitudinal incoming pressure-and-temperature compensating chamber to transport packaged food on said pallet means to said longitudinal incoming pressure-and-temperature compensating chamber, elevator means to incrementally raise packaged food on said pallet means from said longitudinal belt loop to said pair of longitudinal tracks, a second longitudinal pushrod for incrementally moving said pallet means from said elevator means to said pair of longitudinal tracks, and runout line means for collecting sterilized or pasteurized packaged food on said pallet means raised by said elevator means, said runout line means arranged above said elevator means.

4. A system as in claim 1, further comprising a pair of third longitudinal pushrods internal to the longitudinal incoming pressure-and-temperature compensating chamber, said third longitudinal pushrods being arranged to propel said pallet means from the longitudinal incoming pressure-and-temperature compensating chamber into the oven.

5. A system as in claim 1, further comprising a high speed heat chamber, a temperature sterilization chamber and a pair of fourth longitudinal pushrods located in the oven immediately beyond the longitudinal incoming pressure-and-temperature compensating chamber, in the oven said pair of fourth longitudinal pushrods being arranged to propel the pallet means nose to tail through the high speed heat chamber and the temperature stabilization chamber.

6. A system as in claim 1, further comprising a vertical chamber containing a descent elevator having a top tier and a bottom tier, and a fifth longitudinal reciprocating pushrod with a pivoted catch mechanism located in the oven, said fifth longitudinal reciprocating pushrod being arranged to transfer pallet means farthest forward on the conveyor means of the upper level chamber onto the top tier of the descent elevator in the vertical chamber.

7. A system as in claim 1, further comprising a pair of sixth longitudinal reciprocating rods with pivoted catch mechanism, said sixth longitudinal reciprocating rods being arranged to remove individual pallet means from the bottom tier of the descent elevator and to propel said individual pallet means nose to tail along the conveyor means of the lower level chamber.

8. A system as in claim 1, comprising a pair of seventh longitudinal reciprocating rods with pivoted catch mechanisms located at an end of the lower level chamber said seventh longitudinal pushrods being arranged to transfer pallet means farthest forward along the conveyor means of the lower level into the longitudinal outgoing pressure-and-temperature compensating chamber.

9. A system as in claim 1, further comprising a pair of eighth longitudinal pushrods located internal to the longitudinal outgoing pressure-and-temperature compensating chamber, said pair of eighth longitudinal pushrods being arranged to transfer individual pallet means bearing containers or wrappers of the pasteurized or sterilized food from the longitudinal outgoing pressure-and-temperature compensating chamber onto a longitudinal conveyor, said longitudinal conveyor including a pair of belt loops arranged external to the oven and the longitudinal outgoing pressure-and-temperature compensating chamber.

10. A system as in claim 1 further comprising a high speed heat chamber served by a plurality of medium-low power microwave generators singly adjustable for power output between zero and a given maximum, said microwave generators being spaced apart longitudinally at close intervals along the top half of the horizontally disposed cylindrical structure and arranged in three upper rows, disposed one at center and two at 45° on either side of center with waveguides projecting downward radially toward the packaged food on said pallet means, and two additional rows of microwave generators positioned 30° farther around an arc formed by the positions of the first three rows of microwave generators on either side of the first three rows of microwave generators, said two additional rows of microwave generators having waveguides projecting inward radially from along said arc for a first part of the waveguide length and bent to be directed horizontally for a second part of the waveguide length, said second part of the waveguide length of said additional two rows of microwave generators being arranged below the packaged food on the pallet means.

11. A system as in claim 10, further comprising a stabilization chamber served by a second plurality of microwave generators, spaced less closely along the top half of the horizontally disposed cylindrical structure and of lower rated power than said medium-low power microwave generators, in combination with a fan unit installed at one end of the horizontally disposed cylindrical structure, said fan unit being arranged to propel air filling space above the pallet means along the upper level chamber, said air being drawn in over the top side of a longitudinal baffle located high up in the upper level chamber, directed through a battery of heaters, gathered by a further longitudinal baffle located in the lower level chamber and then blown across a vertical chamber into the stabilization chamber beneath oncoming pallet means in said lower level chamber from where said air rises back to the space above the pallet means.

12. A system as in claim 11 further comprising a longitudinal cooling chamber, separated from the vertical chamber by a hinged flap and furnished with a battery of transversely disposed cooling fans from which cold air is blown at the pallet means proceeding along the conveyor means of the lower level chamber toward the longitudinal outgoing pressure-and-temperature compensating chamber.

* * * * *